United States Patent
Minouchi et al.

(10) Patent No.: US 8,053,496 B1
(45) Date of Patent: Nov. 8, 2011

(54) RUBBER WET MASTER BATCH, PROCESS FOR PRODUCING THE SAME, RUBBER COMPOSITION, AND PNEUMATIC TIRE

(75) Inventors: Norio Minouchi, Osaka (JP); Takashi Miyasaka, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 13/088,503

(22) Filed: Apr. 18, 2011

(30) Foreign Application Priority Data

Jan. 14, 2011 (JP) ................ 2011-006134

(51) Int. Cl.
*C08J 3/20* (2006.01)
(52) U.S. Cl. ............ 523/351; 524/495; 524/575.5
(58) Field of Classification Search ............ 523/351; 524/495, 575.5
See application file for complete search history.

(56) References Cited

U.S. PATENT DOCUMENTS

| 2003/0088006 A1 | 5/2003 | Yanagisawa et al. |
| 2010/0144951 A1 | 6/2010 | Yamada et al. |

FOREIGN PATENT DOCUMENTS

| JP | 2004099625 A | 4/2004 |
| JP | 2006213804 A | 8/2006 |
| JP | 2011016874 A | 1/2011 |

OTHER PUBLICATIONS

Notification of Reasons for Refusal for Application No. 2011-006134 dated Mar. 1, 2011 (6 pages)

*Primary Examiner* — Peter D Mulcahy

(74) *Attorney, Agent, or Firm* — Fish & Richardson P.C.

(57) ABSTRACT

A process for producing a rubber wet master batch contains at least a filler, a dispersing solvent and a rubber latex liquid as raw materials, comprising: a step (I) of, at the time of dispersing the filler into the dispersing solvent, adding at least one portion of the rubber latex liquid thereto, thereby preparing a slurry containing the filler to which rubber latex particles adhere; a step (II) of mixing the slurry with the rest of the rubber latex liquid, thereby preparing the rubber latex liquid containing the rubber-latex-particle-adhering filler; and a step (III) of solidifying and drying the rubber latex liquid containing the rubber-latex-particle-adhering filler.

14 Claims, No Drawings

US 8,053,496 B1

RUBBER WET MASTER BATCH, PROCESS FOR PRODUCING THE SAME, RUBBER COMPOSITION, AND PNEUMATIC TIRE

BACKGROUND OF THE INVENTION

1. Field of the Invention

The present invention relates to a rubber wet master batch containing at least a filler, a dispersing solvent and a rubber latex liquid as raw materials, a process for producing the master batch, a rubber composition, and a pneumatic tire.

2. Description of Related Art

Hitherto, it has been known in the rubber industry that when a rubber composition containing a filler such as carbon black is produced, a rubber wet master batch is used in order to improve the workability of the composition and the dispersibility of the filler. The rubber wet master batch is a material obtained by mixing a filler with a dispersing solvent at a predetermined ratio in advance, dispersing the filler in the dispersing solvent by mechanical force to prepare a filler-containing slurry, mixing the slurry and a rubber latex liquid with each other in a liquid phase state, adding a solidifying agent such as an acid to the mixture to solidify the mixture, and collecting and drying the mixture. In the case of using the rubber wet master batch, a rubber composition is obtained which is better in filler-dispersibility and rubber physical properties, such as workability and reinforcing performance, than in the case of using a rubber dry master batch obtained by mixing a filler and a rubber with each other in a solid phase state. The use of this rubber composition as a raw material makes it possible to produce a rubber product (such as pneumatic tire) that has, for example, a reduced rolling resistance and an excellent fatigue resistance.

As a process for producing a natural rubber wet master batch, Patent Document 1 discloses a process for producing a natural rubber wet master batch that includes the step of mixing a slurry in which a filler such as carbon black is previously dispersed in water with a natural rubber latex, wherein as to the particle size distribution of the filler in the slurry, the 90%-by-volume particle diameter (D90) thereof is adjusted to 30 µm or less. Patent Document 2 discloses a natural-rubber wet-master-batch rubber composition obtained by a producing process of mixing a slurry in which carbon black is previously dispersed in water with a natural rubber latex.

[Patent Document 1] Japanese Unexamined Patent Publication No. 2004-99625
[Patent Document 2] Japanese Unexamined Patent Publication No. 2006-213804

SUMMARY OF THE INVENTION

However, the present inventors have made eager investigations to find out that a cured rubber of the natural-rubber wet-master-batch rubber composition obtained by the producing process disclosed in each of the above-described patent documents has room for further improvement in exothermic property, strength and fatigue resistance. Additionally, the producing process described in each of the above-described patent documents has the step of mixing a slurry wherein carbon black is previously dispersed in water with a natural rubber latex. Thus, in a case where considerable time is required from the end of the preparation of the slurry to the mixing thereof with the natural rubber latex, the re-coagulation of the filler such as carbon black advances easily in the slurry. Furthermore, even after the natural rubber wet master batch is prepared, the re-coagulation of the filler advances easily. Thus, it has been found that the dispersion of the filler (such as carbon black) may locally become unfavorable in the finally-obtained rubber composition. When the re-coagulation of the filler advances in the slurry or in the natural rubber wet master batch so that the dispersion of the filler becomes locally unfavorable, the exothermic property, the strength and the fatigue resistance are lowered. Accordingly, under the actual circumferences, there remains room for further improvement in any process for producing a rubber wet master batch when physical properties of the finally-obtained cured rubber are taken into consideration.

The present invention has been made in view of the above-mentioned circumferences, and an object thereof is to provide a rubber wet master batch which contains a uniformly dispersed filler so as to suppress the re-coagulation of the filler over a long time, and which is a raw material for a cured rubber excellent in exothermic property, durability and rubber strength; and a process for producing the master batch.

The above object can be achieved by the present invention described below. That is, a process for producing a rubber wet master batch of the present invention contains at least a filler, a dispersing solvent and a rubber latex liquid as raw materials, comprising: a step (I) of, at the time of dispersing the filler into the dispersing solvent, adding at least one portion of the rubber latex liquid thereto, thereby preparing a slurry containing the filler to which rubber latex particles adhere; a step (II) of mixing the slurry with the rest of the rubber latex liquid, thereby preparing the rubber latex liquid containing the rubber-latex-particle-adhering filler; and a step (III) of solidifying and drying the rubber latex liquid containing the rubber-latex-particle-adhering filler.

According to the above producing process, at the time of dispersing a filler into a dispersing solvent, at least one portion of a rubber latex liquid is added thereto, thereby preparing a slurry containing the filler to which rubber latex particles adhere (step (I)). In this way, a very thin latex phase is generated on a part or the whole of the surface of the filler. Thus, when the slurry is mixed with the rest of the rubber latex liquid in the step (II), the re-coagulation of the filler can be prevented. In addition thereto, also in the step (III), wherein the rubber latex liquid containing the rubber-latex-particle-adhering filler is solidified and dried, the re-coagulation of the filler can be suppressed. As a result, a rubber wet master batch can be produced wherein the filler is uniformly dispersed and the dispersion stability of the filler is excellent over a long time. Since this wet master batch is a master batch wherein the filler is uniformly dispersed so that the re-coagulation of the filler is suppressed over a long time also, a cured rubber obtained by use of this master batch as a raw material is remarkably improved in exothermic property, durability and rubber strength.

This present producing process is better in filler-dispersibility in the slurry, and further makes it possible to prevent the re-coagulation of the filler more satisfactorily than the process including the preparation of a slurry merely by dispersing a filler into a dispersing solvent, so as to produce an advantageous effect that the storage stability of the slurry is also excellent.

In the above rubber wet master batch producing process, it is preferred that in the step (I), the ratio by mass of any solid (rubber) in the added rubber latex liquid is from 1.5 to 10% by mass of the filler. In such cases, a rubber wet master batch can be produced wherein the dispersion degree of the filler is made high while the rubber latex particles are caused to reliably adhere to the filler.

In the above rubber wet master batch producing process, it is preferred that the step (I) is a step of previously mixing the portion of the rubber latex liquid with the dispersing solvent, and subsequently adding the filler to the mixture to disperse the filler therein, thereby preparing the slurry containing the rubber-latex-particle-adhering filler. According to this producing process, the rubber latex particles adhere more reliably and more uniformly to the filler in the step (I). This makes it possible to more reliably suppress the re-coagulation of the filler throughout the process for producing the rubber wet master batch.

In the above rubber wet master batch producing process, it is preferred that the rubber wet master batch obtained after the step (III) contains the filler in an amount of 40 to 80 parts by mass for 100 parts by mass of the rubber. In this case, a rubber wet master batch can be produced wherein an improvement is made in the dispersion degree of the filler and in the endothermic property, durability and rubber strength of a cured rubber produced from this master batch while the balance therebetween is satisfactorily kept.

In the above rubber wet master batch producing process, it is preferred that the filler is carbon black. In the above rubber wet master batch producing process, it is also preferred that the rubber latex liquid is a natural rubber latex liquid. In such cases, a rubber wet master batch can be produced in which the dispersion degree of the filler is reliably made higher and a further improvement is made in the endothermic property, the durability and the rubber strength of a cured rubber produced from this master batch.

The rubber wet master batch according to the present invention is a master batch obtained by: at the time of dispersing a filler into a dispersing solvent, adding at least one portion of a rubber latex liquid thereto, thereby preparing a slurry containing the filler to which rubber latex particles adhere; then mixing the slurry with the rest of the rubber latex liquid; and solidifying and drying the resultant mixture. This rubber wet master batch is a rubber wet master batch wherein the filler is uniformly dispersed and the dispersion stability of the filler is excellent over a long time, and may be a raw material for a cured rubber excellent in exothermic property, durability and rubber strength.

The above rubber wet master batch preferably contains the filler in an amount of 40 to 80 parts by mass for 100 parts by mass of the rubber. This rubber wet master batch is improved in the dispersion degree of the filler and in the exothermic property, durability and rubber strength of a cured rubber produced from this master batch while the balance therebetween is satisfactorily kept.

In the above rubber wet master batch, it is preferred that the filler is carbon black. In the above rubber wet master batch, it is also preferred that the rubber latex liquid is a natural rubber latex liquid. As to the rubber wet master batch in such cases, the dispersion degree of the filler is reliably made higher, and additionally the exothermic property, durability and rubber strength of a cured rubber produced from this master batch are further improved.

The rubber composition according to the present invention is a composition by use of any of the above-mentioned embodiments of the rubber wet master batch. In this rubber composition, the contained filler is uniformly dispersed and the dispersion stability of the filler is excellent over a long time. Accordingly, for example, a pneumatic tire obtained by use of this rubber composition is excellent in exothermic property, durability and rubber strength.

DETAILED DESCRIPTION OF THE PREFERRED EMBODIMENTS

A rubber wet master batch according to the present invention is obtained by: at the time of dispersing a filler into a dispersing solvent, adding at least one portion of a rubber latex liquid is added thereto, thereby preparing a slurry containing the filler to which rubber latex particles adhere (step I); mixing the slurry with the rest of the rubber latex liquid (step II); and solidifying and drying the mixture (step (III)).

In the present invention, the filler is an inorganic filler used ordinarily in the rubber industry, and examples thereof include carbon black, silica, clay, talc, calcium carbonate, magnesium carbonate and aluminum hydroxide. Of these inorganic fillers, carbon black can be particularly preferably used in the present invention.

Examples of the species of the carbon black include carbon black species used in an ordinary rubber industry, such as SAF, ISAF, HAF, FEF, and GPF; and electroconductive carbon black species such as acetylene black and Ketjenblack. The carbon black may be granulated carbon black, which carbon black is granulated in an ordinary rubber industry, considering the handleability thereof, or may be non-granulated carbon black.

The dispersing solvent is particularly preferably water, and may be, for example, water containing an organic solvent.

The rubber latex liquid may be a natural rubber latex liquid, or a synthetic rubber latex liquid.

The natural rubber latex liquid is a natural product produced by a metabolic effect of a plant, and is particularly preferably a natural-rubber/water system liquid, wherein water is a dispersing solvent. The number-average molecular weight of the natural rubber in the natural rubber latex liquid used in the present invention is preferably 2000000 or more, more preferably 2500000 or more. The synthetic rubber latex liquid is, for example, a styrene-butadiene rubber, butadiene rubber, nitrile rubber or chloroprene rubber produced by emulsion polymerization.

Hereinafter, a description is made of a process for producing the rubber wet master batch according to the present invention. In particular, an embodiment in which the filler and the rubber latex liquid are carbon black and a natural rubber latex liquid, respectively, is described. In the present embodiment, a rubber wet master batch can be produced in which the dispersion degree of the carbon black is very high and a further improvement is made in the exothermic property, durability and rubber strength of a cured rubber produced from the master batch. Moreover, the natural rubber latex may be selected from concentrated latex, fresh latex called field latex, and the like without any discrimination.

This producing process includes a step (I) of, at the time of dispersing carbon black into a dispersing solvent, adding at least one portion of a natural rubber latex liquid thereto, thereby preparing a slurry containing the carbon black to which natural rubber latex particles adhere; a step (II) of mixing the slurry with the rest of the natural rubber latex liquid, thereby preparing the rubber latex liquid containing the natural-rubber-latex-particle-adhering carbon black; and a step (III) of solidifying and drying the rubber latex liquid containing the natural-rubber-latex-particle-adhering carbon black.

(1) Step (I)

In the step (I), at the time of dispersing carbon black into a dispersing solvent, at least one portion of a natural rubber latex liquid is added thereto, thereby preparing a slurry containing the carbon black to which natural rubber latex particles adhere. The natural rubber latex liquid may be previously mixed with the dispersing solvent, and subsequently the carbon black may be added to the mixture to disperse the carbon black therein. The carbon black may also be added to the dispersing solvent, and then while the natural rubber latex liquid is added thereto at a predetermined addition rate, the carbon black may be dispersed in the dispersing solvent. Alternatively, the carbon black may be added to the dispersing solvent, and then while the natural rubber latex liquid is added thereto by operation divided in several parts which each give a constant amount of the liquid, the carbon black may be dispersed in the dispersing solvent. By dispersing the carbon black into the dispersing solvent in the state that the natural rubber latex liquid is present therein, a slurry can be prepared which contains the carbon black to which natural rubber latex particles adhere. In the step (I), the addition amount of the natural rubber latex liquid is, for example, from 0.5 to 50% by mass of the total of the used natural rubber latex liquid (the total of the latex liquid portions added in the step (I) and the step (II)).

In the step (I), the ratio by mass of a solid (rubber) in the added natural rubber latex liquid is preferably from 0.5 to 10% by mass of the carbon black, more preferably from 1 to 6% by mass thereof. The concentration of the solid (rubber) in the added rubber latex liquid is preferably from 0.5 to 5% by mass, more preferably from 0.5 to 1.5% by mass. In these cases, a rubber wet master batch can be produced wherein the dispersion degree of the carbon black is made high while the natural rubber latex particles are caused to adhere reliably to the carbon black.

A method for mixing the carbon black with the dispersing solvent in the presence of the natural rubber latex liquid in the step (I) may be a method of using an ordinary dispersing machine, such as a high-shear mixer, a homo-mixer, a ball mill, a bead mill, a high-pressure homogenizer, an ultrasonic homogenizer or a colloid mill, to disperse the carbon black.

The "high-shear mixer" is a mixer having a rotor rotatable at a high speed and a fixed stator wherein the rotor is rotated in the state that a precise clearance is set between the rotor and stator, whereby a high-shear effect acts. In order to generate the high-shear effect, it is preferred to set the clearance between the rotor and the stator to 0.8 mm or less, and set the peripheral speed of the rotor to 5 m/s or more. The high-shear mixer may be a commercially available product, and is, for example, a "HIGH SHEAR MIXER" manufactured by Silverson.

In the present invention, when mixing the carbon black with the dispersing solvent in the presence of the natural rubber latex liquid, thereby preparing the slurry containing the natural-rubber-latex-particle-adhering carbon black, a surfactant may be added thereto in order to improve the dispersibility of the carbon black. The surfactant may be a surfactant known in the rubber industry, and examples thereof include nonionic surfactants, anionic surfactants, cationic surfactants, and amphoteric surfactants. In place of the surfactant or in addition thereto, an alcohol such as ethanol may be used. When the surfactant is used, it is feared that rubber properties of a finally-obtained cured rubber are lowered. Thus, the blend amount of the surfactant is preferably 2 parts or less by mass, more preferably 1 part or less by mass for 100 parts by mass of the solid (rubber) in the natural rubber latex liquid. Even more preferably, the surfactant should not be substantially used.

In the slurry prepared in the step (I), as to the carbon black to which the natural rubber latex particles adhere, the 90% volume particle diameter D90 (μm) is preferably 31 μm or more, more preferably 35 μm or more. In this case, the dispersibility of the carbon black is excellent in the slurry, and further the re-coagulation of the carbon black can be prevented. Thus, the storage stability of the slurry is excellent, and further the exothermic property, durability and rubber strength of a cured rubber finally obtained therefrom are also excellent. In the present invention, the D90 of the carbon black to which the natural rubber latex particles adhere indicates a value obtained by making a measurement in connection with the volume of not only the carbon black but also that of the adhering natural rubber latex particles.

(2) Step (II)

In the step (II), the slurry is mixed with the rest of the natural rubber latex liquid, thereby preparing the rubber latex liquid containing the natural-rubber-latex-particle-adhering carbon black. The method for mixing the slurry with the rest of the natural rubber latex liquid in a liquid phase state is not particularly limited, and may be a method of using an ordinary dispersing machine, such as a high-shear mixer, a homo-mixer, a ball mill, a bead mill, a high-pressure homogenizer, an ultrasonic homogenizer or a colloid mill, to mix the slurry with the rest of the natural rubber latex liquid. At the time of the mixing, the whole of the mixing system including the dispersing machine and the like may be optionally heated.

The rest of the natural rubber latex liquid preferably has a higher solid (rubber) concentration than the natural rubber latex liquid added in the step (I) when the drying period/labor in the next step (III) is taken into consideration. Specifically, the solid (rubber) concentration is preferably from 10 to 60% by mass, more preferably from 20 to 30% by mass.

(3) Step (III)

In the step (III), the rubber latex liquid containing the natural-rubber-latex-particle-adhering carbon black is solidified and dried. The solidifying and drying method may be a solidifying and drying method of incorporating a solidifying agent into the rubber latex liquid containing the natural-rubber-latex-particle-adhering carbon black so as to solidify the latex, and then drying the solidified latex, or may be a drying and caking method of drying the latex without solidifying the latex.

The solidifying agent used in the solidifying and drying method may be a solidifying agent used ordinarily to solidify a rubber latex liquid, and examples thereof include acids such as formic acid and sulfuric acid, and salts such as sodium chloride.

The method for drying the carbon-black-containing natural rubber latex liquid may be a method of using any one of various drying machines such as an oven, a vacuum drier, and an air drier.

In the present invention, a coagulant may be incorporated into the rubber latex liquid containing the natural-rubber-latex-particle-adhering carbon black (this liquid being obtained by mixing the slurry containing the natural-rubber-latex-particle-adhering carbon black with the natural rubber latex liquid in a liquid phase state), and the resultant coagulation may be collected and dried. The coagulant may be any coagulant known as a coagulant for rubber latex liquid. A specific example thereof is a cationic coagulant.

The rubber wet master batch obtained after the step (III) preferably contains the filler in an amount of 40 to 80 parts by mass for 100 parts by mass of the rubber. In this case, the obtained rubber wet master batch can be a master batch in which an improvement is made in the dispersion degree of the filler and in the exothermic property and durability of a cured rubber produced therefrom while the balance therebetween is satisfactorily kept.

In the rubber wet master batch obtained after the step (III), the contained carbon black is uniformly dispersed, so that the master batch is excellent in the dispersion stability of the carbon black over a long time.

One or more blending agents used in an ordinary rubber industry are optionally incorporated into the rubber wet master batch obtained after the step (III), thereby producing the rubber composition according to the present invention.

Examples of the blending agent (s) include a sulfur-based curing agent, a curing accelerator, silica, a silane coupling agent, zinc oxide, stearic acid, a curing acceleration aid, a curing retarder, an organic peroxide, an anti-aging agent, a softening agent such as wax or oil, and a processing aid.

It is sufficient that the species of sulfur in the sulfur-based curing agent is any ordinary sulfur species for rubber, and examples thereof include powdery sulfur, precipitated sulfur, insoluble sulfur, and high-dispersible sulfur. The sulfur content in the rubber composition according to the present invention for a tire is preferably from 0.3 to 6 parts by mass for 100 parts by mass of the rubber component. If the sulfur content is less than 0.3 parts by mass, the crosslinkage density of the cured rubber is insufficient so that the rubber strength and the like are lowered. If the sulfur content is more than 6.5 parts by mass, in particular, both of the heat resistance and the durability deteriorate. In order to keep the rubber strength of the cured rubber good and to improve the heat resistance and the durability, the sulfur content is more preferably from 1.5 to 5.5 parts by mass, even more preferably from 2 to 4.5 parts by mass for 100 parts by mass of the rubber component.

The curing accelerator may be a curing accelerator used ordinarily for rubber curing. Examples thereof include sulfenamide based, thiuram based, thiazole based, thiourea based, guanidine based, and dithiocarbamate based curing accelerators. Such curing accelerators may be used alone or in the form of an appropriate mixture. The curing accelerator content is preferably from 1 to 5 parts by mass, more preferably from 1.5 to 4 parts by mass for 100 parts of the rubber component.

The anti-aging agent may be an anti-aging agent ordinarily used for rubber. Examples thereof include aromatic amine based, amine-ketone based, monophenol based, bisphenol based, polyphenol based, dithiocarbamate based, and thiourea based anti-aging agents. Such anti-aging agents may be used alone or in an appropriate mixture. The anti-aging agent content is preferably from 1 to 5 parts by mass, more preferably from 2 to 4.5 parts by mass for 100 parts by mass of the rubber component.

The rubber composition according to the present invention may be obtained by kneading the rubber wet master batch and one or more optional blending components as described above, using a mixing machine used in an ordinary rubber industry, such as a Banbury mixer, a kneader or rolls; examples of the optional components include a sulfur-based curing agent, a curing accelerator, silica, a silane coupling agent, zinc oxide, stearic acid, a curing acceleration aid, a curing retarder, an organic peroxide, an anti-aging agent, a softening agent such as wax or oil, and a processing aid.

The method for blending the above-mentioned individual components with each other is not particularly limited, and may be any one selected from a method of previously kneading the blending components other than the curing components (such as the sulfur-based curing agent and the curing accelerator) to prepare a master batch, adding the other components thereto, and further kneading the resultant mixture; a method of adding the individual components in any order and kneading the mixture; a method of adding all the components thereto at the same time and kneading the mixture; and the like.

As described above, the rubber wet master batch according to the present invention is a master batch wherein a contained filler is uniformly dispersed and the dispersion stability of the filler is excellent over a long time. Thus, the rubber composition produced by use of this master batch is also a composition wherein the contained filler is uniformly dispersed and the dispersion stability of the filler is excellent over a long time. In particular, a pneumatic tire produced by use of this rubber composition (specifically, a pneumatic tire wherein the rubber composition according to the present invention is used for a tread rubber, a side rubber, a ply or belt coating rubber, or a bead filler rubber) has a rubber region where the filler is satisfactorily dispersed; therefore, the tire has, for example, a reduced rolling resistance, and excellent exothermic property, durability and rubber strength.

EXAMPLES

Hereinafter, the present invention will be more specifically described by way of examples thereof. Raw materials and machines used therein are as follows:

Used Materials:
a) fillers:
 carbon black "N326"; "SEAST 300" (manufactured by Tokai Carbon Co., Ltd.), and
 carbon black "N110"; "SEAST 9" (manufactured by Tokai Carbon Co., Ltd.),
b) dispersing solvent: water,
c) rubber latex liquid:
 natural rubber concentrated latex liquid manufactured by Regitex Corp. (DRC (dry rubber content)=60%),
d) solidifying agent: formic acid (first class 85%, a 10% solution thereof is diluted to adjust the pH to 1.2) manufactured by Nacalai Tesque, Inc.,
e) zinc oxide: #3 zinc flower,
f) stearic acid:stearic acid for industries,
g) wax: microcrystalline wax,
h) anti-aging agents:
 (A) aromatic amine based anti-aging agent: N-(1,3-dimethylbutyl)-N'-phenyl-p-phenylenediamine ("ANTAGE 6C" manufactured by Kawaguchi Chemical Industry Co., Ltd.), and
 (B) 2,2,4-trimethyl-1,2-dihydroquinoline polymer ("NONFLEX RD, manufactured by Seiko Chemical Co., Ltd.),
i) sulfur: 5% oil-treated sulfur, and
j) curing accelerator:
 (A) N-cyclohexyl-2-benzothiazole sulfenamide "SANCELER CM" manufactured by Sanshin Chemical Industry Co., Ltd., and
 (B) 1,3-diphenylguanidine"NOCCELER D" manufactured by Ouchi-Shinko Chemical Industrial Co., Ltd.

Evaluations:

Evaluations are made of a rubber obtained by curing each rubber composition by heating the composition at 150° C. for 30 minutes in a predetermined mold.

Particle Size Distribution (90%-by-Volume Particle Diameter (D90)):

In each slurry produced in the step (I), the D90 (μm) of a filler therein to which rubber latex particles adhere is measured by use of an instrument, "SALD 2200" (refractive index of CB: 2.0-0.10 i), manufactured by Shimadzu Corp in the state that the absorbance is set in the range of 0.01 to 0.1 when the D90 is measured.

Dispersion Stability of the Filler-Containing Slurry:

The filler-containing slurry is collected into a 10-mL sample bottle, and the bottle is allowed to stand still for 24 hours. Thereafter, the phase-separation state of the slurry is observed with the naked eye. On the basis of the following criterion, the dispersion stability thereof is evaluated:
 5: the slurry is not separated,
 4: a thin water membrane is present in the top region,
 3: a water membrane having a thickness of several millimeters is present,
 2: a water membrane having a thickness of about 5 mm is present, and
 1: a clear separation is generated.

In the criterion, rank 5 means that the filler-containing slurry is not separated into plural phases so as to be the best in dispersion stability, and rank 1 means that the filler-containing slurry is separated into liquid/solid phases so as to be the worst in dispersion stability.

Exothermic Property of Cured Rubbers:

In accordance with JIS L 6265, the exothermic property of each of the produced cured rubbers is evaluated on the basis of the loss tangent tan δ thereof. The tan δ is measured by use of a rheospectrometer E4000 manufactured by UBM Co. at a frequency of 50 Hz, a temperature of 80° C. and a dynamic strain of 2%. The measured value is represented by an index. In each of Examples 1 to 3, the result is indexed by regarding the measured value of Comparative Example 1 as 100. It is meant that as the numerical value is smaller, the exothermic property is lower so as to be better. In Example 4, the result is indexed by regarding the measured value of Comparative Example 2 as 100. It is meant that as the numerical value is smaller, the exothermic property is lower so as to be better.

Rubber Strength TB of Cured Rubbers:

About a sample produced from each of the rubbers by use of a JIS-#3 dumbbell, the tensile strength TB (MPa) thereof is measured in accordance with JIS K 6251. In each of Examples 1 to 3, the result is indexed by regarding the measured value of the strength TB of Comparative Example 1 as 100. In Example 4, the result is indexed by regarding the measured value of the strength TB of Comparative Example 2 as 100. It is meant that as the strength TB is larger, the rubber strength is higher so as to be better.

Fatigue Resistance of Cured Rubbers:

As to each of the cured rubbers, the fatigue resistance thereof is measured and evaluated in accordance with JIS K 6260. In each of Examples 1 to 3, the result is indexed by regarding the measured value of Comparative Example 1 as 100. In Example 4, the result is indexed by regarding the measured value of Comparative Example 2 as 100. It is meant that as the numerical value thereof is larger, the fatigue resistance is better.

Example 1

To a diluted latex liquid having a concentration adjusted to 0.5% by mass were added 50 parts by mass of carbon black. The carbon black was dispersed into this liquid by use of ROBOMIX, manufactured by PRIMIX Corporation at 9000 rpm for 30 minutes, so as to prepare a slurry containing the carbon black to which natural rubber latex particles are adhered (step (I)). The D90 of the slurry containing the natural-rubber-latex-particle-adhering carbon black prepared in the step (I) was measured. The result of the D90, and the evaluation result of the dispersion stability of the slurry containing the carbon black are shown in Table 1.

Next, to the slurry containing the natural-rubber-latex-particle-adhering carbon black, which was prepared in the step (I), was added water to set the rest of the natural rubber latex liquid (having a solid (rubber) concentration adjusted to 25% by mass by the addition of water) in such a manner that the total solid (rubber) amount in the rest of the latex liquid and the natural rubber latex liquid used in the step (I) would be 100 parts by mass. Next, a home mixer, SM-L56 model, manufactured by SANYO electric Co., Ltd. was used to mix the individual components with each other (at a mixer rotation number of 11300 rpm for 30 minutes) to prepare a carbon-black-containing natural rubber latex liquid (step (II)).

To the carbon-black-containing natural rubber latex liquid prepared in the step (II) was added a 10% solution of formic acid in water as a solidifying agent until the pH of the liquid turned to 4. The solidified product was dried into water content by percentage of 1.5% or less by use of a screw press, V-01 model, manufactured by Suchiro EPM Corporation. In this way, a natural rubber wet master batch was produced (step (III)).

Various additives described in Tables 2 and 3 were blended with the resultant natural rubber wet master batch to produce a rubber composition. Physical properties of a cured rubber obtained therefrom were measured. The results are shown in Tables 2 and 3.

Examples 2, 3 and 5

Each natural rubber wet master batch, each rubber composition, and each cured rubber were produced in the same way as in Example 1 except that in the step (I) the solid concentration in the added natural rubber latex liquid, and the added amount thereof (the ratio by mass thereof to the carbon black) were changed into a concentration and an added amount in concerned sections of Table 1, respectively. Physical properties of the cured rubber are shown in Tables 2 and 3.

Example 4

A natural rubber wet master batch, a rubber composition, and a cured rubber were produced in the same way as in Example 1 except that a slurry containing natural-rubber-latex-particle-adhering carbon black was prepared by the following method: carbon black was added to water to give a concentration of 5% by mass; and then while a natural rubber latex liquid, which was prepared by the addition of water for giving a solid (rubber) concentration of 0.7% by mass, was added to the carbon black until the amount of the latex liquid turned to 1.4% by mass of the carbon black, ROBOMIX, manufactured by PRIMIX Corporation was used to disperse

TABLE 1

| | Carbon black species | Carbon black amount for 100 parts by mass of rubber | Solid (rubber) concentration in rubber latex liquid in step (I) (% by mass) | Solid (rubber) concentration in rubber latex liquid in step (I) (ratio by mass thereof to carbon black) | D90 (μm) of rubber-latex-particle-adhering filler | Dispersion stability of filler-containing slurry |
|---|---|---|---|---|---|---|
| Comparative Example 1 | N326 | 50 | Not added | Not added | 15 | 2 |
| Example 1 | N326 | 50 | 0.5 | 1 | 48 | 3.5 |
| Example 2 | N326 | 50 | 2.5 | 5 | 130 | 4 |
| Example 3 | N326 | 50 | 5 | 10 | 180 | 4.5 |
| Example 4 | N326 | 50 | 0.7 | 1.4 | 65 | 3.5 |
| Comparative Example 2 | N110 | 50 | Not added | Not added | 11 | 2 |
| Example 5 | N110 | 50 | 5 | 10 | 123 | 4 | the carbon black therein at a rotation number of 9000 rpm for 30 minutes. Physical properties of the cured rubber are shown in Tables 2 and 3.

Comparative Examples 1 and 2

Each natural rubber wet master batch, a rubber composition, and a cured rubber were produced in the same way as in Example 1 except that instead of previously mixing the portion of the natural rubber latex liquid with the dispersing solvent and then adding the carbon black thereto in the steps (I) and (II), a carbon-black-containing natural rubber latex liquid was prepared by preparing a slurry wherein the carbon black was previously dispersed in water and then adding, to this slurry, the total amount of the natural rubber latex liquid. Physical properties of the cured rubber are shown in Tables 2 and 3.

TABLE 2

|  |  | Comparative Example 1 | Example 1 | Example 2 | Example 3 | Example 4 |
|---|---|---|---|---|---|---|
| Natural rubber |  | 100 | 100 | 100 | 100 | 100 |
| Carbon black | N326 | 50 | 50 | 50 | 50 | 50 |
|  | N110 |  |  |  |  |  |
| Zinc oxide |  | 3 | 3 | 3 | 3 | 3 |
| Stearic acid |  | 2 | 2 | 2 | 2 | 2 |
| Wax |  | 2 | 2 | 2 | 2 | 2 |
| Anti-aging | (A) | 2 | 2 | 2 | 2 | 2 |
| agent | (B) | 1 | 1 | 1 | 1 | 1 |
| Sulfur |  | 2 | 2 | 2 | 2 | 2 |
| Curing | (A) | 1.5 | 1.5 | 1.5 | 1.5 | 1.5 |
| accelerator | (B) | 0.5 | 0.5 | 0.5 | 0.5 | 0.5 |
| D90 (μm) of rubber-latex-particle-adhering filler |  | 15 | 36 | 39 | 45 | 65 |
| Exothermic property (tanδ) |  | 100 | 92 | 90 | 90 | 92 |
| Rubber strength TB |  | 100 | 105 | 120 | 120 | 103 |
| Fatigue resistance |  | 100 | 135 | 147 | 137 | 139 |

TABLE 3

|  |  | Comparative Example 2 | Example 5 |
|---|---|---|---|
| Natural rubber |  | 100 | 100 |
| Carbon black | N326 |  |  |
|  | N110 | 50 | 50 |
| Zinc oxide |  | 3 | 3 |
| Stearic acid |  | 2 | 2 |
| Wax |  | 2 | 2 |
| Anti-aging agent | (A) | 2 | 2 |
|  | (B) | 1 | 1 |
| Sulfur |  | 2 | 2 |
| Curing accelerator | (A) | 1.5 | 1.5 |
|  | (B) | 0.5 | 0.5 |
| D90 (μm) of rubber-latex-particle-adhering filler |  | 11 | 48 |
| Exothermic property (tanδ) |  | 100 | 89 |
| Rubber strength TB |  | 100 | 135 |
| Fatigue resistance |  | 100 | 170 |

From the results in Table 1, it is understood that in Examples 1 to 4, the natural rubber latex particles adhered to the carbon black, whereby the D90 was over 30 μm while the dispersibility of the carbon black was better over the long term than in Comparative Examples 1 and 2.

From the results in Table 2, it is also understood that Examples 1 to 4 were each better in the exothermic property, durability and rubber strength of the cured rubber than Comparative Example 1, wherein the same carbon black (N326) was used. From the results in Table 3, it is understood in the same manner that Example 5 was better in the exothermic property, durability and rubber strength of the cured rubber than Comparative Example 2, wherein the same carbon black (N110) was used.

What is claimed is:

1. A process for producing a rubber wet master batch containing at least a filler, a dispersing solvent and a rubber latex liquid as raw materials, comprising:
   a step (I) of, at the time of dispersing the filler into the dispersing solvent, adding at least one portion of the rubber latex liquid thereto, thereby preparing a slurry containing the filler to which rubber latex particles adhere;
   a step (II) of mixing the slurry with the rest of the rubber latex liquid, thereby preparing the rubber latex liquid containing the rubber-latex-particle-adhering filler; and
   a step (III) of solidifying and drying the rubber latex liquid containing the rubber-latex-particle-adhering filler.

2. The rubber wet master batch producing process according to claim 1, wherein in the step (I), the rubber-latex-particle-adhering filler has a 90% volume particle diameter (D90) of 31 μm or more in the slurry.

3. The rubber wet master batch producing process according to claim 1, wherein in the step (I), the ratio by mass of any solid (rubber) in the added rubber latex liquid is from 0.5 to 10% by mass of the filler.

4. The rubber wet master batch producing process according to claim 1, wherein in the step (I), a concentration of the solid (rubber) in the added rubber latex liquid is from 0.5 to 5% by mass.

5. The rubber wet master batch producing process according to claim 1, wherein the step (I) is a step of previously mixing the portion of the rubber latex liquid with the dispersing solvent, and subsequently adding the filler to the mixture to disperse the filler therein, thereby preparing the slurry containing the rubber-latex-particle-adhering filler.

6. The rubber wet master batch producing process according to claim 1, wherein the rubber wet master batch obtained after the step (III) contains the filler in an amount of 40 to 80 parts by mass for 100 parts by mass of the rubber.

7. The rubber wet master batch producing process according to claim 1, wherein the filler is carbon black.

8. The rubber wet master batch producing process according to claim 1, wherein the rubber latex liquid is a natural rubber latex liquid.

9. A rubber wet master batch, which is obtained by: at the time of dispersing a filler into a dispersing solvent, adding at least one portion of a rubber latex liquid thereto, thereby preparing a slurry containing the filler to which rubber latex particles adhere; then mixing the slurry with the rest of the rubber latex liquid; and solidifying and drying the resultant mixture.

10. The rubber wet master batch according to claim 9, which contains the filler in an amount of 40 to 80 parts by mass for 100 parts by mass of the rubber.

11. The rubber wet master batch according to claim 9, wherein the filler is carbon black.

12. The rubber wet master batch according to claim 9, wherein the rubber latex liquid is a natural rubber latex liquid.

13. A rubber composition which is obtained by use of the rubber wet master batch according to claim 9.

14. A pneumatic tire which is obtained by use of the rubber composition according to claim 13.

* * * * *